Oct. 31, 1967   F. J. DECKER   3,350,086
PNEUMATIC SEAT

Filed Oct. 23, 1965   2 Sheets-Sheet 2

INVENTOR.
FREDERICK J. DECKER

BY Thomson & Thomson

ATTORNEYS

United States Patent Office 3,350,086
Patented Oct. 31, 1967

3,350,086
PNEUMATIC SEAT
Frederick J. Decker, Pittsford, N.Y., assignor to Flexible Air Seat Corporation, Los Angeles, Calif., a corporation of California
Filed Oct. 23, 1965, Ser. No. 503,496
10 Claims. (Cl. 267—1)

This invention relates to new and useful improvements in pneumatic seats and relates more particularly to seats for drivers of heavy vehicles such as tractors for trailer units, cross-country buses, on and off highway equipment, locomotives or the like, which may be generally termed "vehicles."

It is well known among manufacturers and operators of vehicles of the above mentioned types, that it is very strenuous to operate such vehicles over long distances for long continuous periods of time. For this reason, many states, at least partly because of the fatigue caused by the hard riding seats of cross-country buses and trucks, limit the number of hours that a driver may be continuously at the wheel. Often the drivers or operators become so fatigued that they have been known to fall asleep at the wheel and, after a lengthy interval of time, become incapacitated through illness and require periods of complete rest in order to regain their health and strength. Loss of time and money to the trucking companies or other owners of the vehicles, and loss of time and money to the driver are a very substantial economic condition. Reference is made to my Patent No. 2,760,552 issued Aug. 28, 1956 entitled "Pneumatic Seat" upon which this application is an improvement. Reference is also made to pending application Ser. No. 392,334, now Patent No. 3,288,454 filed Aug. 26, 1964 entitled "Heavy Duty Vehicle Seat." The invention of this application constitutes a complete reversal of the method of operation shown and described in the above mentioned patent.

The primary object of this invention is to produce a seat for the drivers of buses and trucks which will absorb, to a very substantial extent, and rapidly react to the normal vibratory movement of such vehicles and thereby eliminate much of the stress and strain to which the driver is subjected.

One of the problems in connection with seats for example for buses, is to have enough air capacity between the seat frame and the cab of the vehicle, for example, a truck, to provide enough fluid, usually air, to cushion the road shock. It is an object of this invention to provide such increased air capacity.

Another object of this invention is to provide simple and efficient means associated with the pneumatic pedestal to adapt the seat to short persons and persons of different weights and more readily and conveniently adjust the air pressure therein so as to accommodate persons of different heights and weights.

My invention further contemplates a pneumatic seat wherein a chamber has a large volume of air that under pressure resists the downward movement of the seat when a bump in the road is encountered by the vehicle and a chamber of restricted capacity in one-way communication with said large chamber so that the pressures in said chambers will almost instantly equalize and trap a volume of air in the chamber which restricts the upward movement of the vehicle seat to minimize the bounce which occurs following a bump in the road.

Other objects and advantages of my invention will be particularly set forth in the claims and will be apparent from the following description, when taken in connection with the accompanying drawings, in which:

Figure 1:
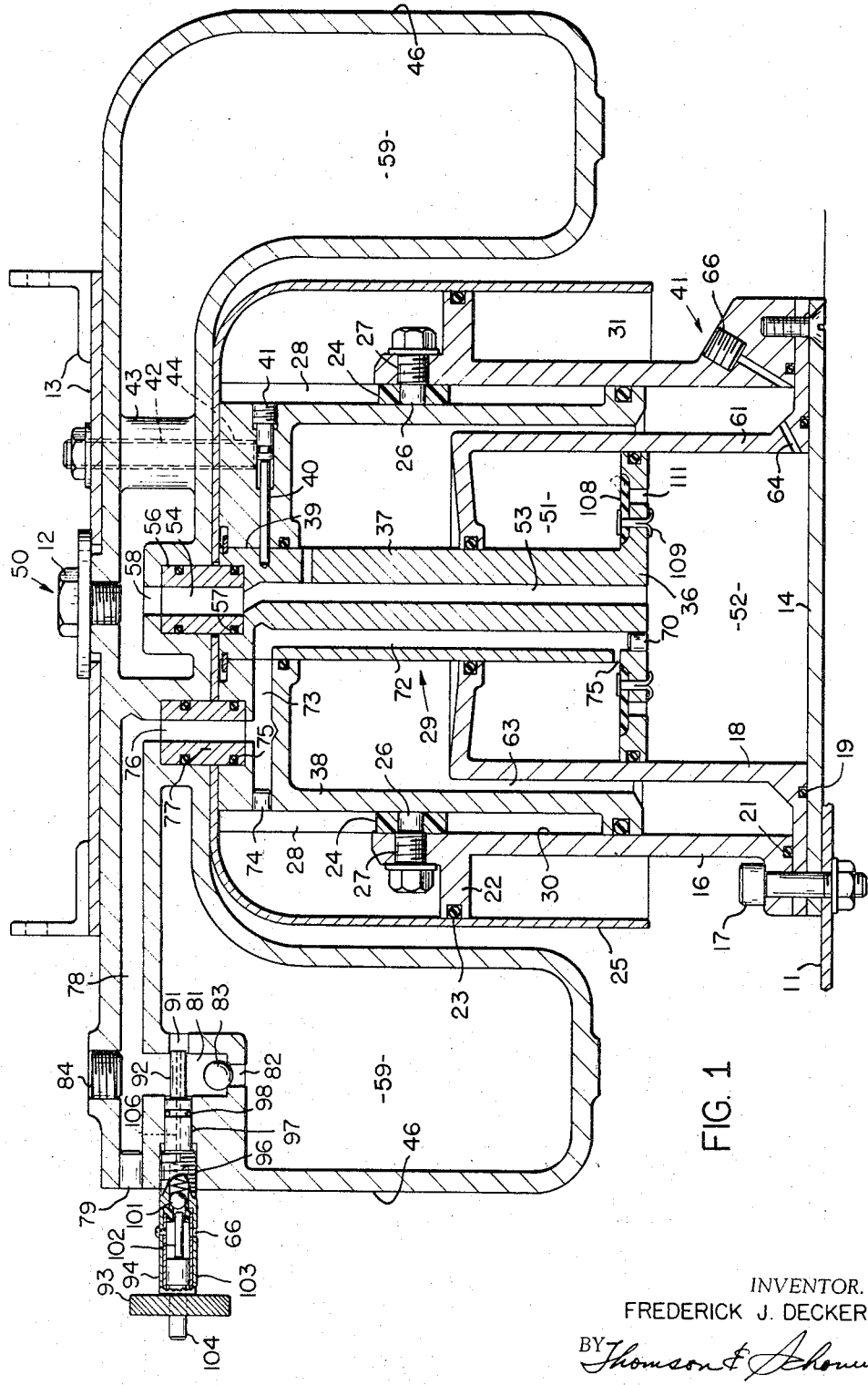
FIG. 1 is a sectional view of the novel seat structure of my invention.
Figure 2:
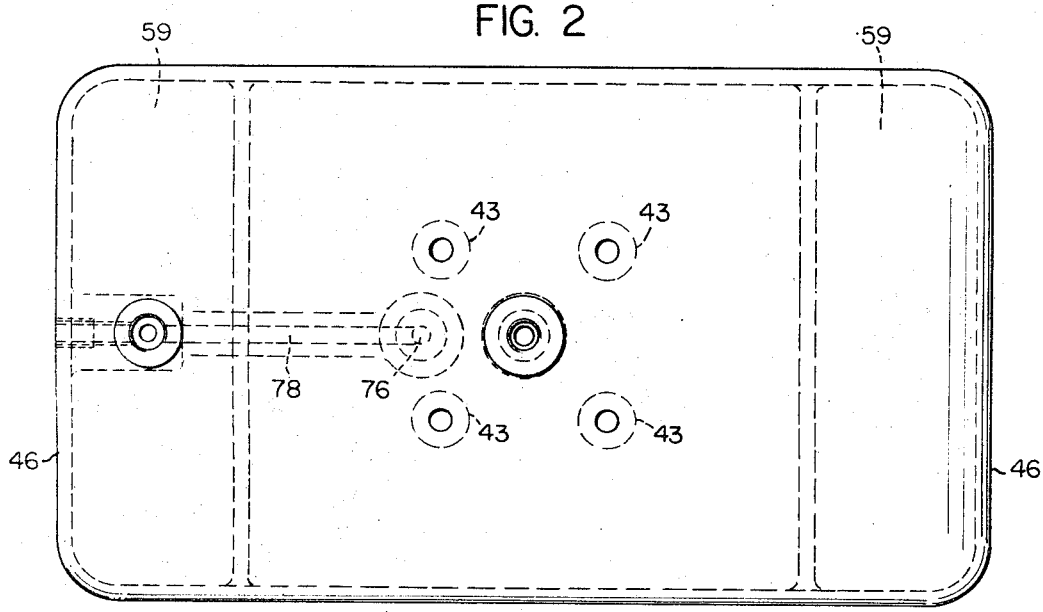
FIG. 2 is a top plan view of FIG. 1 with certain passages shown in dotted lines.

In FIG. 1 of the drawings, I have indicated my novel seat as being mounted on the floor 11 of a bus, truck or other vehicle, the seat being located above the structure shown in FIG. 1 in the usual cooperative relationship with a steering wheel (not shown). Connections to the seat frame are shown at 12 and 13. The arrangement of parts may be similar to that shown in FIG. 1 of the above mentioned Patent No. 2,760,552.

The fluid cushioning mechanism which constitutes my invention is shown primarily in FIG. 1 and is mounted on a plate 14 which carries a cylinder 16 bolted to the floor of the cab and to the plate 14 as shown at 17. A fixed cylinder 18 defining an air chamber rests on the base 14 and is sealed with respect thereto by an annular O-ring 19. Cylinder 16 is also sealed by an O-ring 21. The cylinder 16 extends upward and has an annular flange 22 which is sealed as by an O-ring 23 with respect to a bell shaped member 25. The upper end of the cylinder 16 carries one or more nylon rollers 24 which are rotatable on the end of stub shafts 26 which are part of nut and bolt assemblies 27.

The rollers 24 ride in vertical ways 28 integral with a piston assembly, generally indicated by the numeral 29. The piston assembly reciprocates in accordance with the bounce of the vehicle on the irregularities of the road with respect to the cylinder 16 being sealed from a wall 30 thereof by an O-ring 31.

The piston assembly 29 includes a piston 36 having a piston rod 37 through which passages to be later described extend. Piston assembly 29 includes a cylindrical bell shaped part 38 which for convenience of manufacture is separated from the piston rod as shown at 39. The piston rod 37 and the bell shaped piston 38 are tied together by one or more pins 40 held in position by screws 41. The seat assembly indicated by the numerals 12 and 13 is fixed with respect to the piston assembly, generally indicated by the numeral 29, by four threaded bolts 42 (see FIG. 1) which extend through bosses 43 into the piston assembly 29 as indicated at 44.

A saddle shaped casting 46 is mounted on the piston assembly 29 and is held in position by the bolts 42 so that it moves upward and downward with the piston assembly. Thus, there is provided a construction which includes two fixed cylinders 16 and 18 and an upwardly and downwardly reciprocable assembly comprising bell shaped chamber 38, piston 36, piston rod 37, all associated parts and the saddle shaped casting 46.

The piston 36 divides the cylinder 38 into an upper chamber 51 and a lower chamber 52. The upper chamber 51 is a confined space and, as will presently appear, its pressure and capacity restrain the rebound of the seat as the truck passes over irregularities in the road. The effective lower chamber 52 is of large volume and its pressure and capacity control the downward movement of the piston assembly 29.

One of the important features of the invention is the fact that the effective lower chamber 52 is of greatly augmented volume by reason of the construction shown. This volume should be as large as possible. The large capacity desired is difficult to attain in the relatively small confines of, for example, a truck cab and within the dimensions of the driver's seat. For this purpose the lower chamber 52 is connected by a passage 53 extending through the piston 36 and the piston rod 37 which connects with a passage 54 formed in a collar 56. The collar 56 is sealed with respect to the adjacent parts by sealing rings 57. The passage 54 connects with a passage 58 formed in the saddle shaped casting 46. The passage 58 opens into an enlarged chamber 59 formed in the saddle shaped casting. In addition to the chamber 59, the effective chamber 52 is still further augmented by a chamber 61 and a chamber 62 which are connected together by an annular space 63 formed between the outer wall of the cylinder 18 and the bell shaped casting 38. Chamber 52 is connected with the chamber 61 by one or more passages 64 formed in the cylinder 18. As the piston moves downward, it compresses the air in all the connected chambers 52, 61, 62 and 59.

Air is supplied to the chamber 52 and its connected chambers through a connection 66 to which a hand pump may be fitted. However, if desired, a piston pump of the type shown and described in the above mentioned patent may be employed. As is explained more fully in the above mentioned patent, air is supplied at a pressure such, with the piston areas involved, as to support the weight of the operator of the vehicle. In general, with the dimensions of the pistons and air capacities involved, a pressure of approximately seven pounds is required in the chamber 52 and its connected chambers in order to support the weight of a two hundred pound man to maintain the seat level at a height such that the operator's eyes are at a level so he can see through the windshield. If a person of lesser weight occupies the seat, means are provided for increasing the pressure in chamber 52 and its connected chambers as will presently appear.

As previously mentioned, the upper chamber 51 is a confined space. Its outlet is a restricted one having a passage 71 extending laterally through the wall of the piston rod 37 and connected to a vertical passage 72 formed in the piston rod. A plug 70 closes the lower end of vertical passage 72. A lateral passage 73, one end of which is closed by a plug 74 extends through the bell shaped casting 38 and connects with a passage 76 formed in a member 77. Member 77 is sealed with respect to the adjacent parts as shown at 75.

The passage 76 connects with a lateral passage 78 formed in the saddle shaped casting 46, the end of which is closed by a plug 79. The lateral passage 78 connects with a vertical passage or small chamber 81 which is decreased in diameter, as shown at 82, to form a seat for a ball 83. The ball 83 acts as a check valve when on its seat. The ball 83 is, under most conditions, in sealed relation with its seat, that is, whenever the pressure in the confined chamber 51 is greater than or equal to the pressure in the chamber 52 and its connected chambers as previously described. It is also on its seat when the pressures are equal due to the weight of the ball. A screw plug 84 closes the upper end of the vertical passage 81. Upon removal of the screw plug 84 access to the passage may be obtained for cleaning the check valve and other parts which will be presently described.

A second passage 91 is provided between the chamber 59 and the enlarged passage or valve chamber 81. A stem 92 which fits the passage 91 is connected to a knurled finger piece 93 by means of a hollow cylindrical member 94. The hollow cylindrical member 94 is threaded, as shown at 96, for reception in a threaded bore in the saddle shaped casting 46. Bore 96 has a cylindrical part 97 to receive the end of the valve stem. An O-ring 98 is provided to prevent air leakage around the cylindrical part of the valve stem.

A spring pressed ball check valve 101 is mounted in a bore in the enlarged cylindrical part of the valve stem and may be engaged by the stem 102 of a plunger 103 actuated by a projecting thumb-piece 104. Upon pressing the button 104, the check valve 101 is opened and air escapes from the chamber 59 and its connected chambers through a passage 106 formed in the valve through a port 66 in the hollow cylindrical member 94. When there is inward pressure on the button 104 which is under the finger tip control of the operator it opens the check valve 101 to permit air under pressure to escape from the chamber 59 to atmosphere and lower the level of the vehicle seat. The necessity for this lowering of the pressure arises when pressure in the connected chambers 59 and 52 is at a level more than required to support the operator at the level he desires or if the operator for which the system is set is replaced by a person of lesser weight. Thus, the pressure air in the chamber 52 and its connecting chambers including the chamber 59 may be controlled accurately with relation to the weight of the person on the truck seat by either admitting air through the port 66 or allowing it to escape by pressing on the finger piece 104.

Pressure between the chambers 51 and 52 is normally equalized when the pressure in the chamber 52 is increased, through a plurality of flap type check valves 108 held in position by clips 109. As indicated in dotted lines in FIG. 1, the flap valves 108 open upwardly and open passages 111 between the chambers 51 and 52 when the pressure in chamber 52 is greater than the pressure in chamber 51. However, when the flap check valves 108 are closed, no passage of air occurs and of course air is prevented from flowing from chamber 51 to chamber 52.

Let us assume that a two hundred pound man is seated on the seat diagrammatically illustrated at 12 and 13. Air is then pumped through the passage 66-64 into all the chambers on the lower side of the piston assembly 29 to balance the weight of the man. In the proportions of the structure shown, the piston 36 will then be approximately 3″ from the bottom plate 14 and seven pounds of air occupy the chambers 52 and 59. The pressure in the chamber 51 will also be at seven pounds, the pressure in the chambers 51 and 52 equalizing through the flap check valves 108. The pressures will be equalized at approximately the same level so long as the vehicle is quiescent or traveling over a smooth road. As soon as the vehicle travels over a bump or depression in the road so that the piston, generally indicated by the numeral 29, moves downward, the pressure in the chamber 52 and its connected chambers increases. The piston area of the two pistons exposed to the pressure on the lower sides of the piston assembly 29 is relatively large and therefore the downward movement of the piston assembly occasioned by the bump is resisted. Almost immediately the pressures in the chambers 52 and 51 equalize through the opening of flap check valves 108. The air in chamber 51 is trapped. As soon as the conditions cause an upward movement of the piston 36, the trapped air resists the upward movement and prevents the seat from bouncing to the extent that the road irregularity has caused the vehicle as a whole to move upward. The result is a relative quiescent state of the seat as compared to the amplitude of movement of the truck.

From what has previously been described, escape of air from the chamber 51 through passages 71, 72, 73, 76 and 78 to the chamber 59 may be cut off entirely by setting inwardly the knurled thumbpiece 93. The escape of air is cut off when the stem 92 completely closes the passage 91. However, usually a slight bleed opening is desirable. By adjusting this bleed opening the amount of "bounce" of the vehicle seat may be controlled by the operator.

It will be appreciated that as the piston 36 moves upward the pressure in the chamber 52 and its connected chambers decreases, thus increasing the differential in pressure between the chambers 51 and 52. The air in chamber 51 is more or less trapped and the ratio of pressures between chambers 51 and 52 may be as much as 2:1. The effects of dampening out the movements of the piston assembly 29 and the reactions thereof occur within approximately a one-half second so that seat movement does not reflect road conditions. Instead the seat rides on a cushion of air and partakes of only a fraction of the irregularities in the road. The air check valve 83 only lifts off its seat when the pressure in the chamber 59 is higher than the pressure in the passages 81, 78 connected to the chamber 51 which can occur momentarily when the piston 36 is moving downward.

Figures 3, 4:
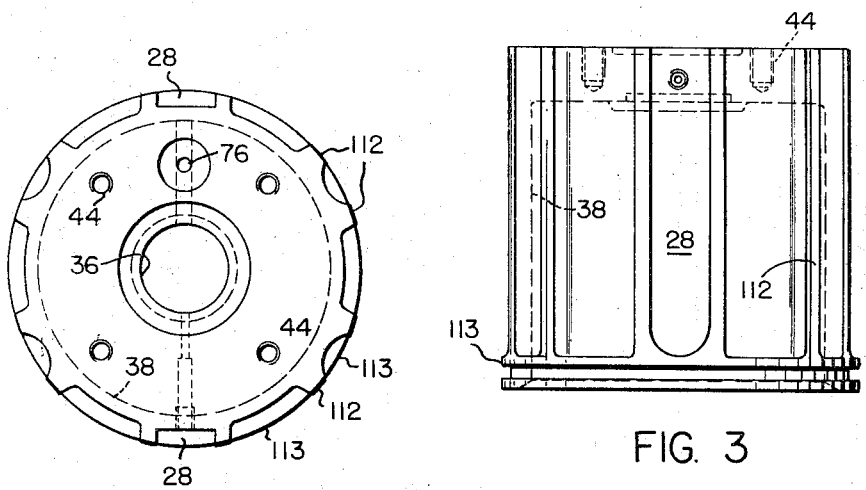
FIG. 3 is a side elevation of the piston of the hydraulic system of my invention.
FIG. 4 is a top plan view of FIG. 3.

One of the important features of my invention is a means of preventing seizure of the piston assembly 29 in the cylinders 16 and 18. Upon referring to FIGS. 3 and 4 it will be noted that the bell shaped casting 38, constituting part of the piston assembly, has a pair of annular rings 111 at its lower end in which the O-ring 31 gasket lies and a plurality of vertically extending lands 112 separated by vertically extending cutouts 113. The scalloping of the wall of the piston casting 38 provides a limited contact between the piston 38 and the wall of the cylinder 16. It has been found in practice that the drivers of motor vehicles do not always sit in the center of the seat. If the driver sits off center, the downward force on the piston assembly 39 is eccentric to the axis tending to cock the piston in the cylinder 16 and tending to cause the piston assembly 29 to seize in the cylinders 16 and 18. By providing only limited contact between the piston 38 and the walls of its cylinder the possibility of seizure is reduced.

While I have shown and described the preferred form of mechanism of my invention, it will be apparent that various modifications and changes may be made therein, particularly in the form and relation of parts, without departing from the spirit of my invention as set forth in the appended claims.

I claim:

1. A seat structure for vehicles wherein a seat frame is connected to a base by a fluid system to minimize the transmittal of road shocks to the seat frame, said fluid system comprising, in combination:
    (a) a cylinder having a piston operable therein, said piston being connected to said seat frame and dividing said cylinder into upper and lower chambers;
    (b) check valve means between said chambers permitting flow of fluid from said lower chamber to said upper chamber, the fluid in said lower chamber cushioning the downward movement of said piston due to road shock and the fluid in said upper chamber resisting the upward movement of said piston on the rebound from said road shock; and
    (c) an adjustable bleed opening between said upper and lower chambers.

2. A seat structure in accordance with claim 1 in which said piston carries a saddle shaped fluid chamber in fluid connection with the chamber below said piston.

3. A seat structure in accordance with claim 1 in which the piston is free-floating on a cushion of air and means are provided between the piston and cylinder for preventing rotation of the piston.

4. A seat structure in accordance with claim 1 wherein means are provided for pumping air into said lower chamber and releasing air from said upper chamber to adjust the position of the piston in accordance with the weight of the person occupying the seat.

5. A seat structure in accordance with claim 1 wherein means are provided for raising and lowering the pressure in both chambers to suit the physical characteristics of the user as to height and weight.

6. A seat structure for vehicles wherein a seat frame is connected to a base by a pneumatic system to minimize the transmittal of road shocks to the seat frame, said system comprising, in combination:
    (a) a pair of fixed cylinders;
    (b) a piston operable in each of said cylinders, said pistons being connected so that they move upward and downward together and said pistons defining chambers on the lower sides thereof and said chambers being interconnected and are filled with air under pressure;
    (c) a chamber on the upper side of one of said chambers filled with air under pressure and resisting the upward movement of said piston; and
    (d) restricted outlet means from said upper chamber.

7. A seat structure in accordance with claim 6 in which means are provided between one of said cylinders and one of said pistons for preventing rotation of said pistons during their upward and downward travel.

8. A seat structure in accordance with claim 1, wherein said piston is subjected to a great many reciprocations per minute during the operation of the vehicle over the irregularities of a highway, said structure further including means for minimizing contact of said piston with the cylinder walls; and means comprising a plurality of cutouts existing longitudinally of the cylinder walls.

9. A seat structure in accordance with claim 8 in which one of said piston and cylinder has ways and the other carries rollers to guide the movement of the cylinder.

10. In a seat structure in accordance with claim 1, wherein said piston separates two air chambers maintained under pressure, means for lowering the pressure in said chambers comprising a spring pressed ball check valve, a plunger engageable with said ball to shift it off its seat and permit escape of air and a finger piece accessible to the operator of the vehicle for actuating the plunger.

References Cited

UNITED STATES PATENTS 3,288,454   11/1966   Decker _____ 267—1

ARTHUR L. LA POINT, *Primary Examiner.*

R. M. WOHLFARTH, *Assistant Examiner.*